(12) United States Patent
Jung et al.

(10) Patent No.: US 11,831,241 B2
(45) Date of Patent: Nov. 28, 2023

(54) THREE-LEVEL BUCK CONVERTER CONFIGURABLE FOR TWO-LEVEL BUCK CONVERTER MODE OPERATION

(71) Applicant: QUALCOMM Incorporated, San Diego, CA (US)

(72) Inventors: Sanghwa Jung, Los Gatos, CA (US); Chunping Song, Palo Alto, CA (US); Ta-Tung Yen, San Jose, CA (US); Yue Jing, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/363,948

(22) Filed: Jun. 30, 2021

(65) Prior Publication Data
US 2023/0006555 A1   Jan. 5, 2023

(51) Int. Cl.
*H02M 3/158* (2006.01)
*H02M 3/07* (2006.01)

(52) U.S. Cl.
CPC ........... *H02M 3/1582* (2013.01); *H02M 3/07* (2013.01)

(58) Field of Classification Search
CPC .... H02M 3/1582; H02M 3/07; H02M 1/0032; H02M 3/158
See application file for complete search history.

(56) References Cited

U.S. PATENT DOCUMENTS 10,886,851 B1 * 1/2021 Fletcher ................ H02M 3/156
2020/0161976 A1 * 5/2020 Song ...................... H02M 3/158

* cited by examiner

Primary Examiner — Adolf D Berhane
Assistant Examiner — Afework S Demisse
(74) Attorney, Agent, or Firm — Patterson + Sheridan LLP

(57) ABSTRACT

A three-level buck converter circuit configurable to transition between a three-level buck converter mode and a two-level buck converter mode and methods for regulating power using such a circuit. One example power supply circuit generally includes a three-level buck converter circuit and a control circuit coupled to the three-level buck converter circuit and configured to control operation of the three-level buck converter circuit between a three-level buck converter mode and a two-level buck converter mode. The three-level buck converter circuit generally includes a first switch, a second switch coupled to the first switch via a first node, a third switch coupled to the second switch via a second node, a fourth switch coupled to the third switch via a third node, a first capacitive element coupled between the first node and the third node, and an inductive element coupled between the second node and an output node.

28 Claims, 10 Drawing Sheets

THREE-LEVEL BUCK CONVERTER CONFIGURABLE FOR TWO-LEVEL BUCK CONVERTER MODE OPERATION

TECHNICAL FIELD

Certain aspects of the present disclosure generally relate to electronic circuits and, more particularly, to a configurable three-level buck converter capable of transiting between a three-level buck converter mode and a two-level buck converter mode.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator may be implemented, for example, by a switched-mode power supply (SMPS), such as a buck converter, a boost converter, a buck-boost converter, or a charge pump.

For example, a buck converter is a type of SMPS that may include: (1) a high-side switch coupled between a relatively higher voltage rail and a switching node, (2) a low-side switch coupled between the switching node and a relatively lower voltage rail, (3) and an inductor coupled between the switching node and a load. The high-side and low-side switches are typically implemented with transistors, although the low-side switch may alternatively be implemented with a diode.

Power management integrated circuits (power management ICs or PMICs) are used for managing the power requirement of a host system and may include and/or control one or more voltage regulators (e.g., buck converters and/or LDOs). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure are directed to a power supply circuit. The power supply circuit generally includes a three-level buck converter circuit and a control circuit coupled to the three-level buck converter circuit and configured to control operation of the three-level buck converter circuit between a three-level buck converter mode and a two-level buck converter mode. The three-level buck converter circuit generally includes a first switch, a second switch coupled to the first switch via a first node, a third switch coupled to the second switch via a second node, a fourth switch coupled to the third switch via a third node, a first capacitive element coupled between the first node and the third node, and an inductive element coupled between the second node and an output node.

Certain aspects of the present disclosure provide a method of regulating power. The method generally includes operating a three-level buck converter circuit in a three-level buck converter mode and operating the three-level buck converter circuit in a two-level buck converter mode.

Certain aspects of the present disclosure provide a power management integrated circuit (PMIC) comprising at least a portion of the power supply circuit described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
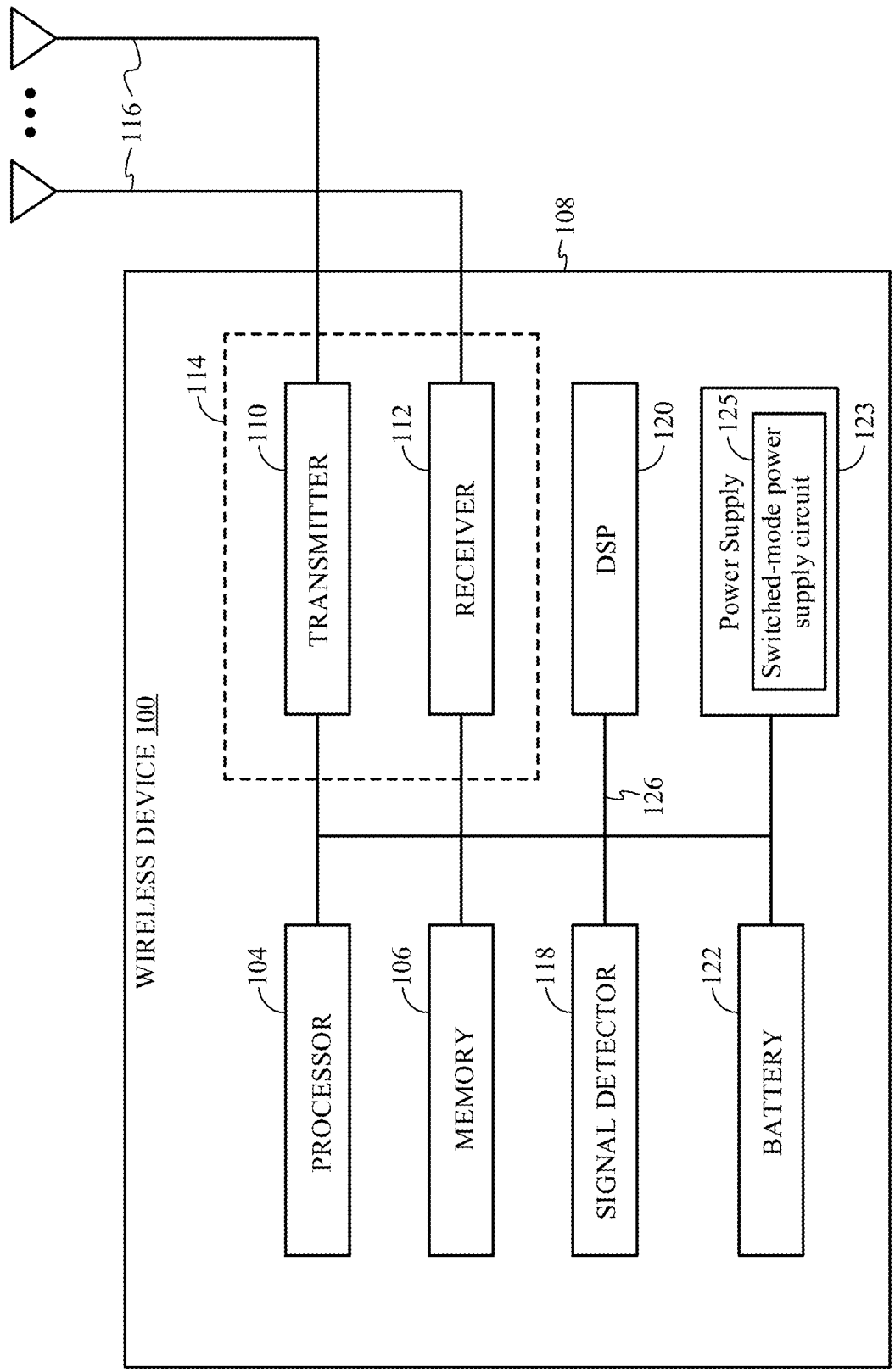
FIG. 1 illustrates a block diagram of an example device that includes a power supply system with at least one switched-mode power supply (SMPS) circuit, in accordance with certain aspects of the present disclosure.

Certain aspects of the present disclosure provide a configurable three-level buck converter capable of transiting between a three-level buck converter mode and a two-level buck converter mode and techniques for regulating power using such a three-level buck converter.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in many apparatuses, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

Power management integrated circuits (power management ICs or PMICs) are used for managing the power requirement of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion, battery charging, power-source selection, voltage scaling, power sequencing, etc.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100 (e.g., when the device is disconnected from an external power source). The device 100 may also include a power supply system 123 for managing the power from the battery (or from one or more power ports for receiving external power) to the various components of the device 100. At least a portion of the power supply system 123 may be implemented in one or more power management integrated circuits (power management ICs or PMICs) The power supply system 123 may perform a variety of functions for the device 100 such as DC-to-DC conversion, battery charging, power-source selection, voltage scaling, power sequencing, etc. For example, the power supply system 123 may include a battery charging circuit (e.g., a master-slave battery charging circuit) for charging the battery 122. The power supply system 123 includes one or more power supply circuits, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit. For certain aspects, the switched-mode power supply circuit 125 may include a three-level buck converter, which can switch between operating in a three-level buck converter mode and a two-level buck converter mode, as described below.

The various components of the device 100 may be coupled together by a bus system 126, which may include a power bus, a control signal bus, and/or a status signal bus in addition to a data bus.

Example Power Supply Scheme

Figure 2:
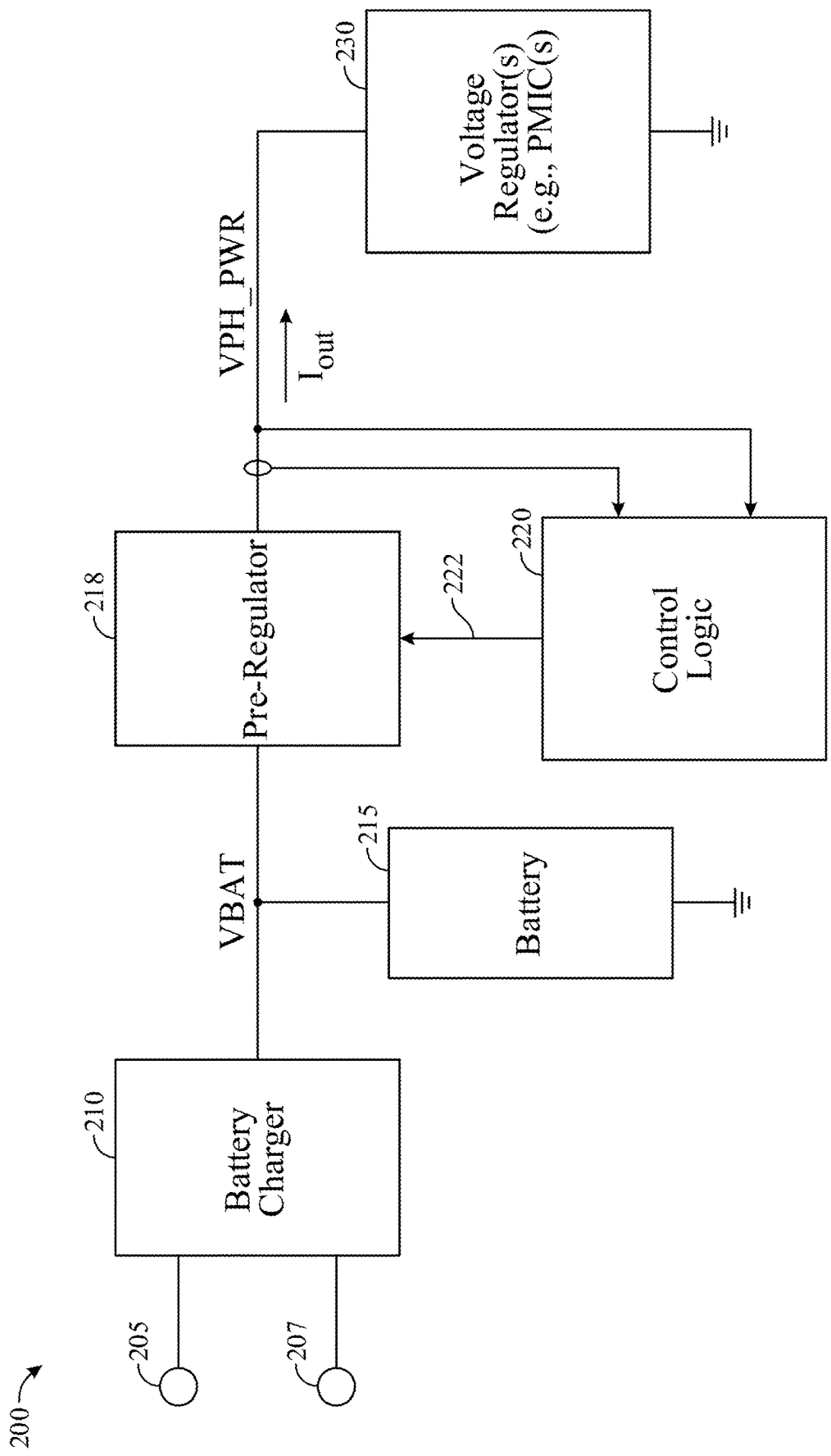
FIG. 2 is a block diagram of an example power supply scheme comprising a battery charging circuit, a battery circuit, and a pre-regulator for regulating power to one or more voltage regulators, in accordance with certain aspects of the present disclosure.

FIG. 2 is a block diagram of an example power supply scheme 200, in accordance with certain aspects of the present disclosure. The power supply scheme 200 includes a battery charging circuit 210, a battery circuit 215, a pre-regulator 218, and one or more voltage regulators 230. Control logic 220 may receive various inputs (e.g., voltage and/or current feedback signals) and may control the pre-regulator 218, the battery charging circuit 210, and/or the voltage regulators 230.

The battery charging circuit 210 may receive power from one or more ports (e.g., ports 205 and 207), and this received power may be converted and used to charge a battery or a battery pack in a battery circuit 215 of a portable device (e.g., a smartphone, tablet, and the like). For example, port 205 may be a Universal Serial Bus (USB) port for connecting to a wall adapter, whereas port 207 may be a wireless power port. The battery circuit 215 may include a single-cell or multi-cell-in-series battery (e.g., a two-cell-in-series, or 2S, battery). The battery circuit 215 may also include any protection circuitry, which may include switches implemented by transistors, for example. For certain aspects, the battery charging circuit 210, or at least a portion thereof, may reside in a PMIC in the device. The battery charging circuit 210 may comprise, for example, one or more switched-mode power supplies (e.g., a buck converter and/or a charge pump converter). For certain aspects, the battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies, such as a three-level buck converter topology. However, one or more of the buck converters may be replaced with a charge pump converter in some parallel charging circuits.

The pre-regulator 218 may receive power from the battery with a voltage VBAT (e.g., 7 to 9 V). Used to regulate power for the voltage regulators 230, the pre-regulator 218 may comprise, for example, one or more switched-mode power supplies (e.g., a buck converter, a charge pump converter, or an adaptive combination power supply circuit capable of switching therebetween). As described below, the control logic 220 may receive an indication of a current associated with the pre-regulator 218 (e.g., output current Tout) and an indication of the output voltage VPH_PWR (e.g., 3.3 to 4 V) from the pre-regulator. Based, at least in part, on these indications, the control logic 220 may output one or more control signals 222 to control the pre-regulator 218. For example, in the case of a three-level buck converter topology, the control logic 220 may output signals as inputs to the gate drivers for driving the power transistors to regulate the output voltage VPH_PWR. The one or more voltage regulators 230 may include one or more linear regulators and/or one or more switching regulators for generating smaller voltages (e.g., 1.2 to 3.3 V) from VPH_PWR. For certain aspects, the voltage regulators 230 may include core PMICs for the device.

Example Power Supply Circuit and Operation

As described above, a pre-regulator (e.g., the pre-regulator 218) may be implemented by a switched-mode power supply (e.g., a buck converter, a charge pump converter, or an adaptive combination power supply circuit capable of switching therebetween), which may be a single-phase or multi-phase converter. For certain aspects, a three-level buck converter may be utilized to implement a pre-regulator.

Figure 3:
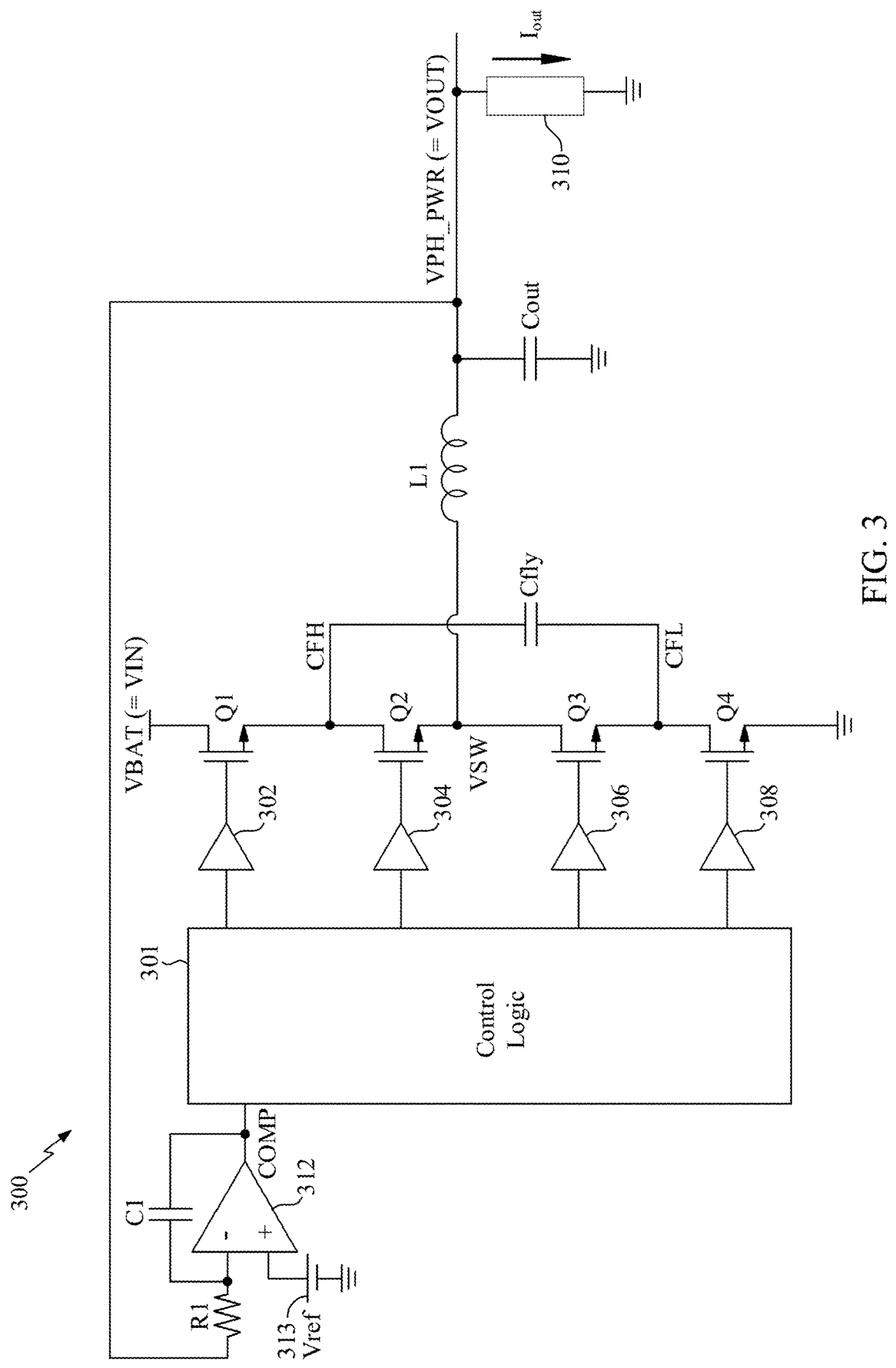
FIG. 3 is a circuit diagram of an example power supply circuit with a three-level buck converter, in accordance with certain aspects of the present disclosure.

A single-phase three-level buck converter topology (as illustrated in the power supply circuit 300 of FIG. 3) may include four switches (implemented by a first transistor Q1, a second transistor Q2, a third transistor Q3, and a fourth transistor Q4), a flying capacitive element Cfly, an inductive element L1, and one or more shunt capacitive elements (represented here by capacitor Cout). An output node (labeled "VPH_PWR" or "VOUT") of the power supply circuit 300 may be coupled to a shunt load 310. Output current $I_{out}$ of the power supply circuit 300 may pass through the shunt load 310, as is shown in FIG. 3. An adaptive combination power supply circuit may be realized by adding a switch (not shown) across the inductive element L1 of the three-level buck converter topology. With such a switch closed, the adaptive combination power supply circuit may function as a single-phase divide-by-two (Div2) charge pump converter.

Transistor Q2 may be coupled to transistor Q1 via a first node (labeled "CFH" for flying capacitor high node), transistor Q3 may be coupled to transistor Q2 via a second node (labeled "VSW" for voltage switching node), and transistor Q4 may be coupled to transistor Q3 via a third node (labeled "CFL" for flying capacitor low node). For certain aspects, the transistors Q1-Q4 may be implemented as n-type metal-oxide-semiconductor (NMOS) transistors, as illustrated in FIG. 3. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electrical ground) for the power supply circuit 300. The flying capacitive element Cfly may have a first terminal coupled to the first node and a second terminal coupled to the third node. The inductive element L1 may have a first terminal coupled to the second node and a second terminal coupled to the output node (labeled "VPH_PWR," but also referred to as "VOUT"), the one or more shunt capacitive elements, and the shunt load 310.

Control logic 301 may control operation of the power supply circuit 300 and may be the same or different from control logic 220 in FIG. 2. For example, control logic 301 may control operation of the transistors Q1-Q4 via output signals to the inputs of respective gate drivers 302, 304, 306, and 308. The outputs of the gate drivers 302, 304, 306, and 308 are coupled to respective gates of transistors Q1-Q4. During operation of the power supply circuit 300, the control logic 301 may cycle through four different phases, which may differ depending on whether the duty cycle is less than 50% or greater than 50%.

For certain aspects, the power supply circuit 300 may include one or more feedback circuits. The feedback circuits may sense the output voltage $V_{out}$ from the output node and/or the output current $I_{out}$ delivered to the load 310, process the sensed voltage and/or current, and feed the processed signal(s) to the control logic 301. The control logic 301 may control operation of the power supply circuit 300 based on the processed signal(s). The feedback circuits may be implemented by any of various suitable circuits for sensing and processing voltage or current. In the example of FIG. 3, the feedback circuit for sensing the output voltage $V_{out}$ includes an error amplifier 312, a voltage source 313, a resistive element (represented by resistor R1), and a capacitive element (represented by capacitor C1). As shown, the output (labeled "COMP") of the error amplifier 312 is coupled to the negative terminal of the error amplifier 312 via the capacitive element and to the control logic 301. The positive terminal of the error amplifier 312 is coupled to the output node VPH_PWR via the resistive element. The voltage source 313 may be tunable and may generate a reference voltage Vref for the error amplifier 312.

Operation of the power supply circuit 300 with a duty cycle of less than 50% is described first. In a first phase (referred to as a "charging phase"), transistors Q1 and Q3 are activated, and transistors Q2 and Q4 are deactivated, to charge the flying capacitive element Cfly and to energize the inductive element L1. In a second phase (called a "holding phase"), transistor Q1 is deactivated, and transistor Q4 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q2 and Q4 are activated, and transistor Q3 is deactivated, to discharge the flying capacitive element Cfly and to energize the inductive element L1. In a fourth phase (also referred to as a "holding phase"), transistor Q3 is activated, and transistor Q2 is deactivated, such that the flying capacitive element Cfly is disconnected and the inductive element L1 is deenergized.

Operation of the power supply circuit 300 with a duty cycle greater than 50% is similar in the first and third phases, with the same transistor configurations. However, in the second phase (called a "holding phase") following the first phase, transistor Q3 is deactivated, and transistor Q2 is activated, such that the VSW node is coupled to an input voltage node (labeled "VBAT," but also referred to as input node "VIN"), the flying capacitive element Cfly is disconnected, and the inductive element L1 is energized. Similarly in the fourth phase (also referred to as a "holding phase") with a duty cycle greater than 50%, transistor Q1 is activated, and transistor Q4 is deactivated, such that the flying capacitive element Cfly is disconnected and the inductive element L1 is energized.

Operating the Three-Level Buck Converter Circuit as a Two-Level Buck Converter

For switching regulators, a light load condition occurs when the current in the inductor discharges to zero. Under light load conditions, certain three-level buck converters may operate with a discontinuous conduction mode (DCM) and a pulse-skipping mode. When the input voltage (VIN) is close to twice the desired output voltage (VOUT), however, the inductor current (IL) is limited and cannot go higher, even with longer on-time. For example, if VIN=7.5 V and the desired VOUT is 3.3 V, then the switching node VSW will be switching between 0 and 3.75 V (=VIN/2). Since VOUT is close to VIN/2, when the converter is turned on for about 400 ns, the build-up inductor current may be quite small (e.g., only a peak current of 383 mA). The normal three-level buck converter mode may not be able to achieve high power efficiency (e.g., at least 90%) with light loads because the converter cannot build up high inductor energy with one-time switching. Therefore, the three-level buck converter may operate with a higher switching frequency, which may lead to more switching loss and lower power efficiency.

Figure 4A:
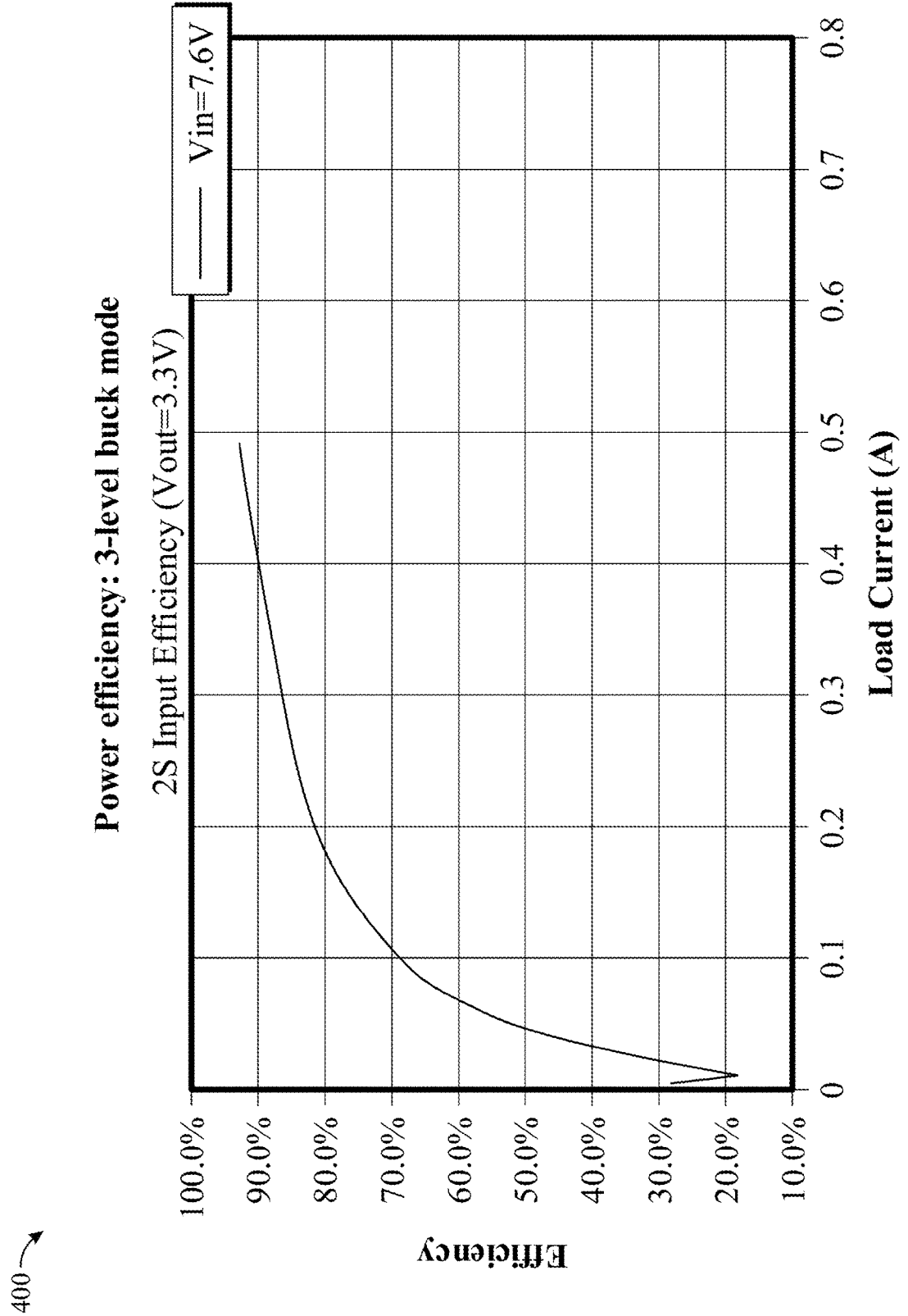
FIG. 4A is a graph of example power efficiency for a three-level buck converter operating in a three-level buck converter mode for all load conditions, in accordance with certain aspects of the present disclosure.

For example, FIG. 4A is a graph 400 of example power efficiency for a three-level buck converter (operating as such) for various load conditions. In the graph 400, VIN is 7.6 V, VOUT is 3.3 V, and the curve represents the relationship between the load current ($I_{out}$) and power efficiency. For small values of load current (e.g., 0.3 A), the efficiency drops from 80% down to 20%.

Certain aspects of the present disclosure operate a three-level buck converter circuit in a two-level buck converter mode during light load conditions, thereby providing a three-level buck converter circuit capable of operating in either a three-level or a two-level buck converter mode. With this configurable three-level buck converter circuit, when a light load entering condition is detected, the two-level buck converter mode may be enabled. When a light load exiting condition is detected, the three-level buck converter mode may be activated, in which the converter circuit operates as a normal three-level buck converter (e.g., with the four phases described above with respect to FIG. 3).

In a first phase of the two-level buck converter mode, the three-level buck converter is in powering mode, and the switching node VSW is pulled up to the power supply rail voltage (e.g., to the input voltage of the input node VIN). To achieve this, transistors Q1 and Q2 (as shown in FIG. 3) are concurrently turned on (e.g., the switches are closed), and transistors Q3 and Q4 are concurrently turned off (e.g., the switches are opened). In a second phase of the two-level buck converter mode, the three-level buck converter is in freewheeling mode, and the switching node VSW is pulled down to the reference potential (e.g., to electrical ground at 0 V). In this case, transistors Q3 and Q4 are concurrently turned on, and transistors Q1 and Q2 are concurrently turned off. Thus, the three-level buck converter behaves as a two-level buck converter when the two-level buck converter mode is enabled.

Operating the three-level buck converter in the two-level buck converter mode for light load conditions may significantly increase power efficiency. Based on the example presented above where VIN=7.5 V and the desired VOUT=3.3 V, the switching node VSW will switch from 0 V to 7.5 V with the two-level buck converter mode (as compared to 0 V to 3.75 V with the three-level buck converter mode). Thus, when the converter is turned on for one 400 ns period, the inductor current may build up to 4 A, which is more than ten times the current transferred using the three-level buck converter mode with this example (and also corresponds to about one hundred times more energy transferred to the output).

Figure 5:
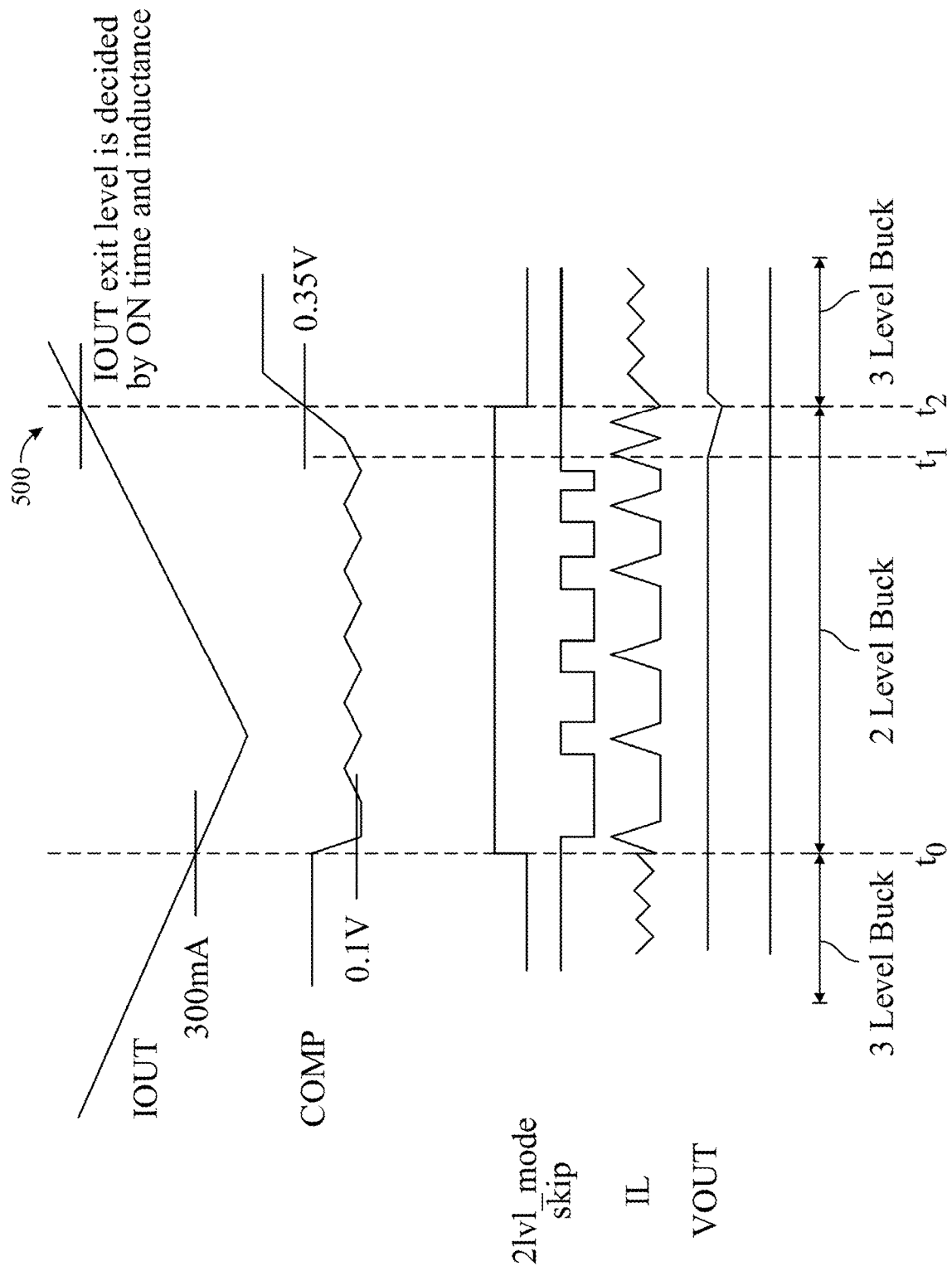
FIG. 5 is an example timing diagram of a three-level buck converter transitioning between three-level and two-level buck converter modes, in accordance with certain aspects of the present disclosure.

FIG. 5 is an example timing diagram 500 of a three-level buck converter circuit transitioning between three-level and two-level buck converter modes, in accordance with certain aspects of the present disclosure. Initially, the three-level buck converter circuit may be operating in the three-level buck converter mode, as shown. During certain modes, a current-sensing circuit may be sensing the load current ($I_{out}$) and providing an indication of the sensed load current to the control logic (e.g., control logic 220 or 301).

In some scenarios, the load current may decrease and fall below a light load entering threshold (e.g., 300 mA) at time t0. When $I_{out}$ is determined to be lower than the light load entering threshold by the control logic, the power supply circuit may enter the two-level buck converter mode (as indicated by a signal labeled "2lvl_mode" transitioning from logic low to logic high at time t0). Upon entering the two-level buck converter mode, the control logic may control the gate drivers 302, 304, 306, 308 to drive the transistors Q1-Q4 in the two-level buck converter mode, such that the inductor current (IL) has a greater peak current, as described above and shown by the inductor current signal in FIG. 5. The control logic may effectively control the transistors Q1-Q4 to operate in the two-level buck converter mode with constant on-time (as illustrated in FIG. 5) or with constant peak current.

Shortly after entering the two-level buck converter mode at time t0, the pulse-skipping mode signal (labeled "skip") may be asserted (e.g., transitioning from logic high to logic low) to enter the pulse-skipping mode. While operating in the two-level buck converter mode, the output voltage (of the output node VOUT) may be sensed, and if the output voltage falls below a certain level, the skip signal may be deasserted (e.g., transitioning from logic low to logic high) to have the converter circuit enter the first phase and ramp up the inductor current (IL). The converter circuit may enter the second phase of the two-level buck converter mode according to the constant on-time or constant peak current operation and allow the inductor current to ramp down. The control logic may assert the skip signal to bring the inductor current to zero. The inductor current may be more frequently fired as the load current increases, as shown in FIG. 5.

The control logic may cause the three-level buck converter to exit the two-level buck converter mode (and return to the three-level buck converter mode) when the light load condition is no longer present. To increase the stability of the control loop for the control logic, it may be desirable to introduce hysteresis into the circuit by making the light load exiting threshold greater than the light load entering threshold. For certain aspects, the control logic may monitor the load current ($I_{out}$) directly and exit the two-level buck converter mode when the load current is greater than a certain current threshold. For other aspects, however, the current-sensing circuit may be sleeping during the off-period of the pulse-skipping mode (e.g., when the skip signal is deasserted). During these periods, the current-sensing circuit may not be available to monitor the load current ($I_{out}$) and determine that the load current is sufficiently high to exit the two-level buck converter mode. Therefore, for certain aspects, the output voltage from the error amplifier 312 at the COMP node may be used to indirectly monitor the load current in the two-level buck converter mode. In such cases, when the load current is higher than the two-level buck converter mode's maximum current capability, the output voltage (VOUT) may start to droop at time t1, as illustrated in FIG. 5, and after some delay due to the integrator topology, the output voltage of the error amplifier 312 at the COMP node increases. When this output voltage at the COMP node is greater than a threshold voltage (e.g., 0.35 V, which may be higher than a pulse-skipping mode threshold), the control logic exits the two-level buck converter mode (e.g., the 2lvl_mode signal is deasserted) and enters the three-level buck converter mode at time t2. For a constant on-time operation in the two-level buck converter mode, the maximum current capability for the two level-buck converter mode may be based on VIN, VOUT, the inductance of inductive element L1, and the on-time interval (Ton). With these exiting strategies, the light load exiting threshold may be a current threshold or a voltage threshold.

Figure 4B:
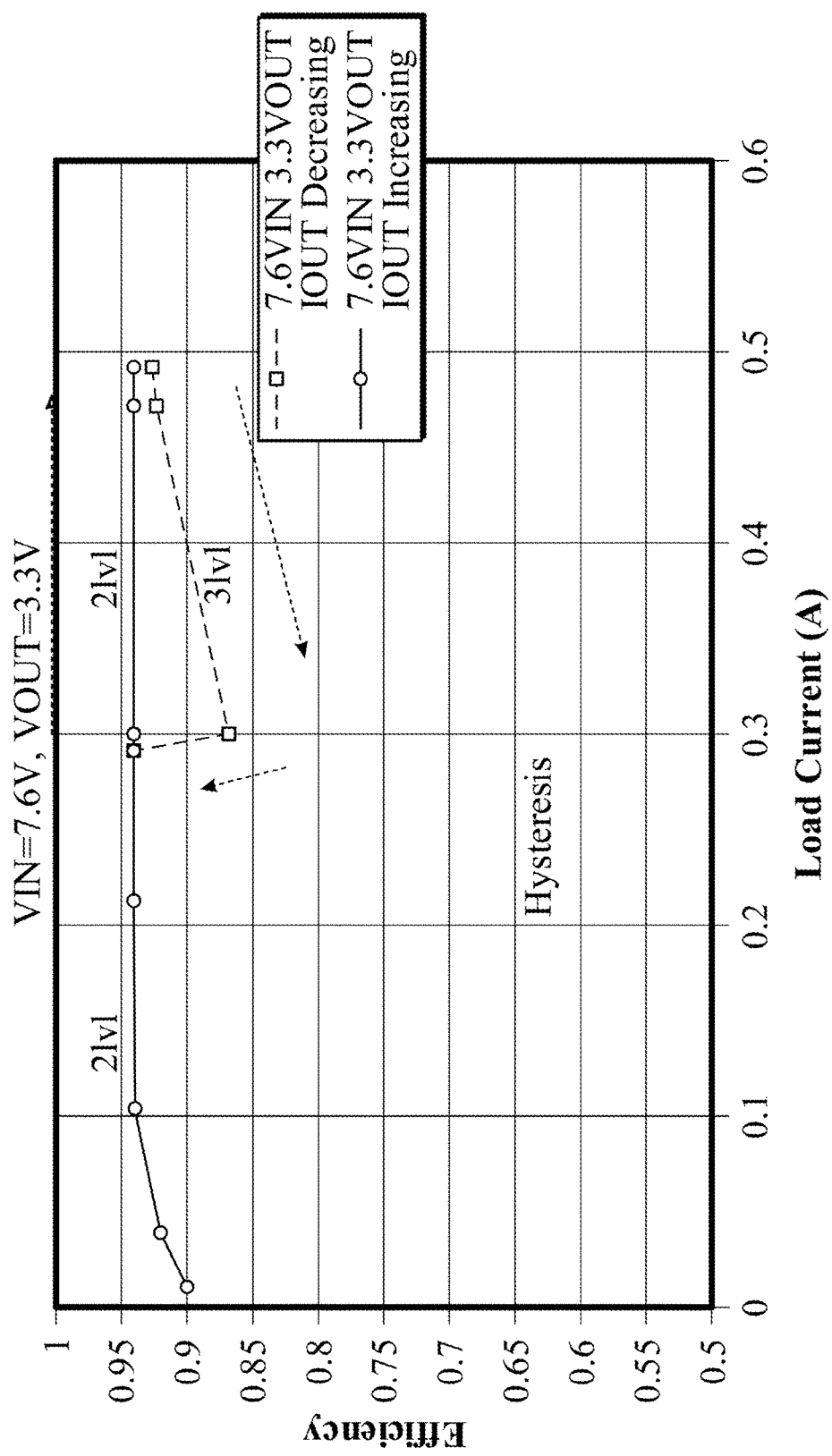
FIG. 4B is a graph of example power efficiency for a three-level buck converter transitioning between three-level and two-level buck converter modes, in accordance with certain aspects of the present disclosure.

FIG. 4B is a graph 420 of example power efficiency for a three-level buck converter, illustrating the hysteresis of the transitions between three-level and two-level buck converter modes, in accordance with certain aspects of the present disclosure. In the graph 400, VIN is 7.6 V, and VOUT is 3.3 V, the same as for the graph 400 of FIG. 4A. Starting from the far right in the graph 420 where the three-level buck converter is operating in a three-level buck converter mode with high efficiency and high load current, the efficiency of the converter decreases as the load current drops (e.g., from about 93% to about 87%). When the load current falls below the light load entering threshold (here, 300 mA), the converter transitions to operating in the two-level buck converter mode, and the efficiency increases (e.g., to 94%). If the load current continues to decrease, the efficiency remains high (e.g., above 90%) when operating in the two-level buck converter mode, even down to load currents as low as 10 mA or so. As the load current increases, the three-level buck converter remains in the two-level buck converter mode (e.g., even above the light load entering threshold of 300 mA) until a certain light load exiting threshold is surpassed. At this point, the converter may return to operating in the three-level buck converter mode.

Therefore, by using the three-level buck converter in a two-level converter mode during light load conditions, power efficiency may be significantly increased.

Example Cfly Balancing for Two-Level Buck Converter Mode

Figure 6A:
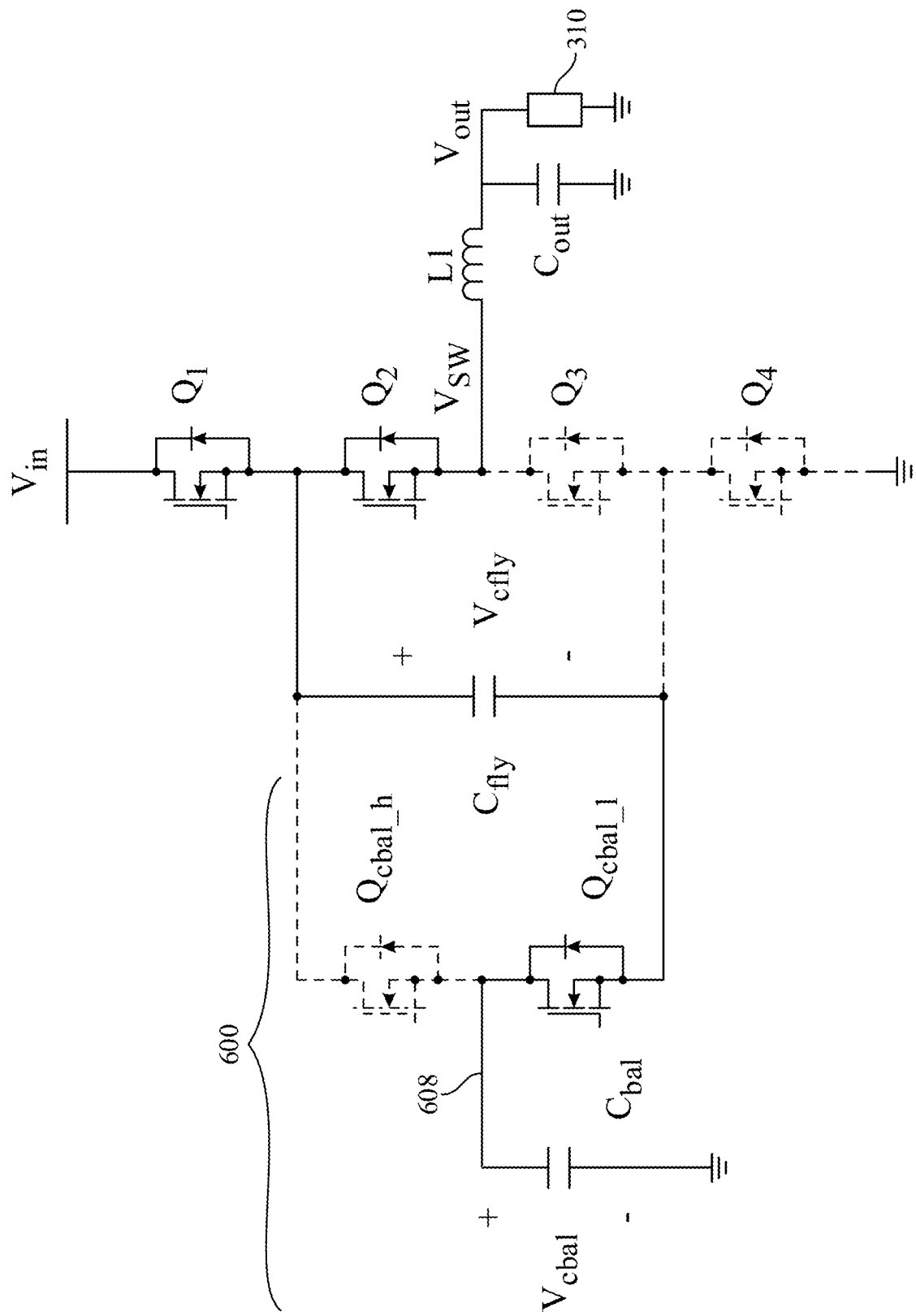
FIG. 6A is a schematic diagram of an example three-level buck converter circuit with a balancing capacitor circuit operated during a first phase of a two-level buck converter mode, in accordance with certain aspects of the present disclosure.
Figure 6B:
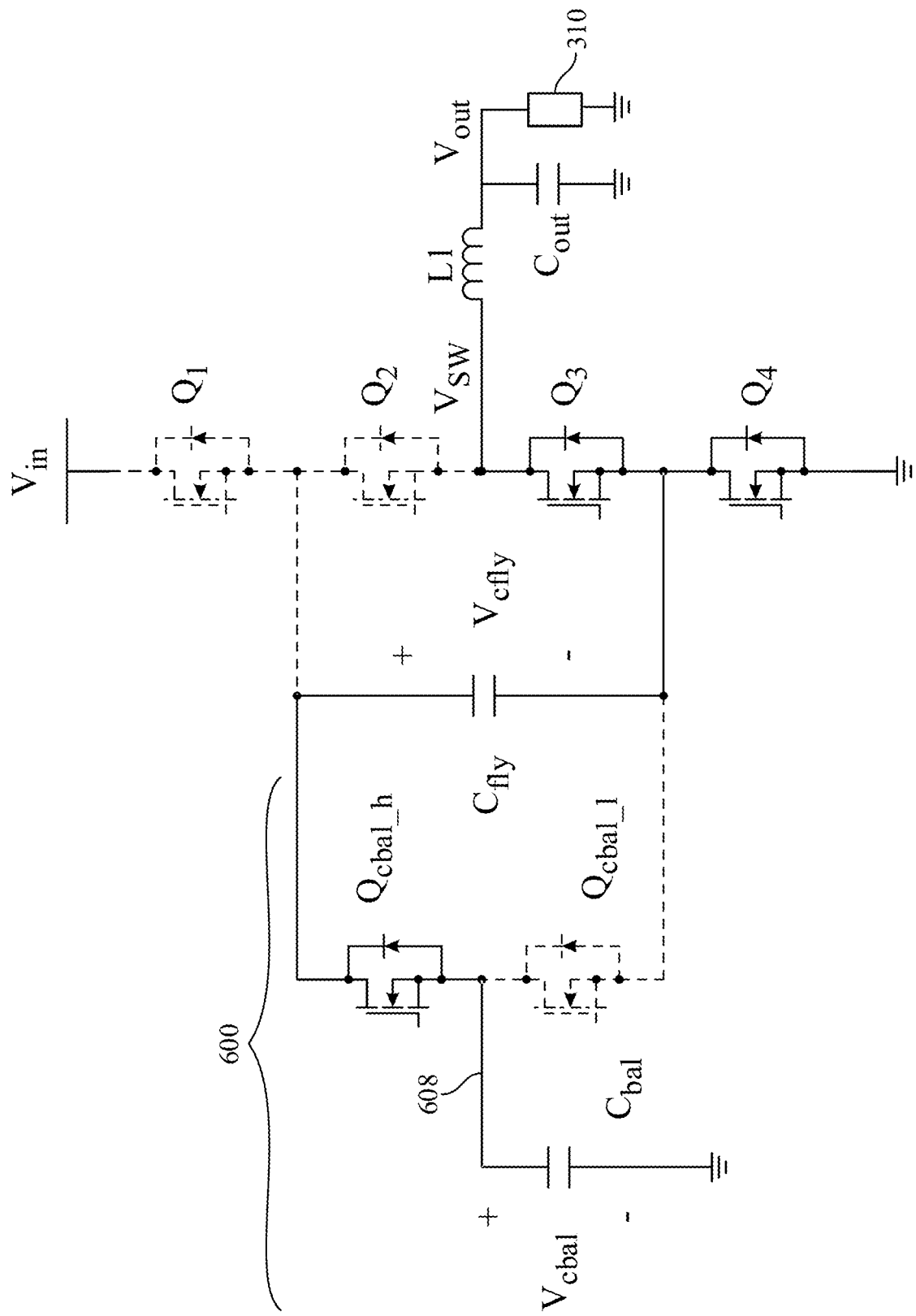
FIG. 6B is a schematic diagram of an example three-level buck converter circuit with a balancing capacitor circuit operated during a second phase of a two-level buck converter mode, in accordance with certain aspects of the present disclosure.

For certain aspects, the three-level buck converter may include a voltage control circuit 600 for controlling the voltage $V_{cfly}$ across the flying capacitor Cfly during operation of the buck converter (e.g., control the voltage $V_{cfly}$ to a defined voltage of Vin/2 (half the input voltage)), as illustrated in FIGS. 6A and 6B. The voltage control circuit 600 may include upper and lower balancing switching devices (e.g., transistors Qcbal_h and Qcbal_l) coupled in series, the series combination being coupled in parallel with the flying capacitor Cfly. Similar to the switching devices (transistors Q1, Q2, Q3, and Q4) in the buck converter, each of the balancing switching devices (Qcbal_h and Qcbal_l) may be configured as a transistor, such as a field-effect transistor (FET), a derivative thereof (e.g., NMOS FET, PMOS FET, pass gate, transmission gate, etc.), or a bipolar junction transistor (BJT). The set of balancing switching devices (Qcbal_h and Qcbal_l) includes a set of control inputs (e.g., gates) configured to receive a set of control signals. Similar to the control signals for the switching devices (transistors Q1, Q2, Q3, and Q4) in the buck converter, the set of control signals in the voltage control circuit controls the closed (on) and open (off) states of the set of balancing switching devices (Qcbal_h and Qcbal_l). In this example, the control signal being a logic high voltage closes the corresponding switching device, and being a logic low voltage opens the corresponding switching device. This may be the same as or different from the switching devices (transistors Q1, Q2, Q3, and Q4) of the three-level buck converter.

The voltage control circuit 600 further includes a balancing capacitor Cbal coupled between a node 608 between the balancing switching devices (Qcbal_h and Qcbal_l) and the reference potential node (e.g., electrical ground). That is, a first terminal of the balancing capacitor Cbal is coupled to node 608, and a second terminal of the balancing capacitor Cbal is coupled to the reference potential node. The balancing capacitor Cbal may be configured to have substantially the same capacitance as the flying capacitor Cfly. This is done so that the voltage $V_{cfly}$ across the flying capacitor Cfly is substantially the same as the voltage $V_{cbal}$ across the balancing capacitor Cbal (e.g., at substantially Vin/2), when these capacitors are coupled in series between the power supply rail (Vin) and the reference potential node (e.g., when transistors Q1 and Qcbal_l are turned on).

During three-level buck converter mode operation, transistor Qcbal_l may be closed (and transistor Qcbal_h may be open) during flying capacitor Cfly charging when transistors Q1 and Q3 are closed (and transistors Q2 and Q4 are open). In addition, transistor Qcbal_h may be closed (and transistor Qcbal_l may be open) during flying capacitor Cfly discharging when transistors Q2 and Q4 are closed (and transistors Q1 and Q3 are open). As described above, the three-level buck converter may be operated in a two-level buck converter mode to increase the efficiency during light load conditions. It may be desirable to balance the flying capacitor Cfly (e.g., to Vin/2) during operation in the two-level buck converter mode, as well. Without such balancing, the inductor current (IL) may exhibit an uneven peak when transitioning from the two-level to the three-level buck converter mode, which may take a relatively long time (e.g., 100 μs) to settle until the flying capacitor Cfly is eventually rebalanced.

FIG. 6A is a schematic diagram of an example three-level buck converter circuit with the voltage control circuit 600 operated during the first phase of the two-level buck converter mode, in accordance with certain aspects of the present disclosure. In the first phase, transistors Q1, Q2, and Qcbal_l are turned on, while transistors Q3, Q4, and Qcbal_h are turned off, as shown. In this manner, the flying capacitor Cfly is effectively connected in series with the balancing capacitor Cbal during the first phase.

FIG. 6B is a schematic diagram of an example three-level buck converter circuit with the voltage control circuit 600 operated during the second phase of the two-level buck converter mode, in accordance with certain aspects of the present disclosure. In the second phase, transistors Q3, Q4, and Qcbal_h are turned on, while transistors Q1, Q2, and Qcbal_l are turned off, as shown. In this manner, the flying capacitor Cfly is effectively connected in parallel with the balancing capacitor Cbal during the second phase.

To implement this capacitor balancing in the three-level and two-level buck converter modes, the control logic may control the gate driver of transistor Qcbal_l such that: (1) in the two-level buck converter mode, transistor Qcbal_l is turned on if transistors Q1 and Q2 are turned on, and (2) in the three-level buck converter mode, transistor Qcbal_l is turned on if transistors Q1 and Q3 are turned on. Otherwise, transistor Qcbal_l may be turned off. The control logic may also control the gate driver of transistor Qcbal_h such that: (1) in the two-level buck converter mode, transistor Qcbal_h is turned on if transistors Q3 and Q4 are turned on, and (2) in the three-level buck converter mode, transistor Qcbal_h is turned on if transistors Q2 and Q4 are turned on. Otherwise, transistor Qcbal_h may be turned off.

Figure 6C:
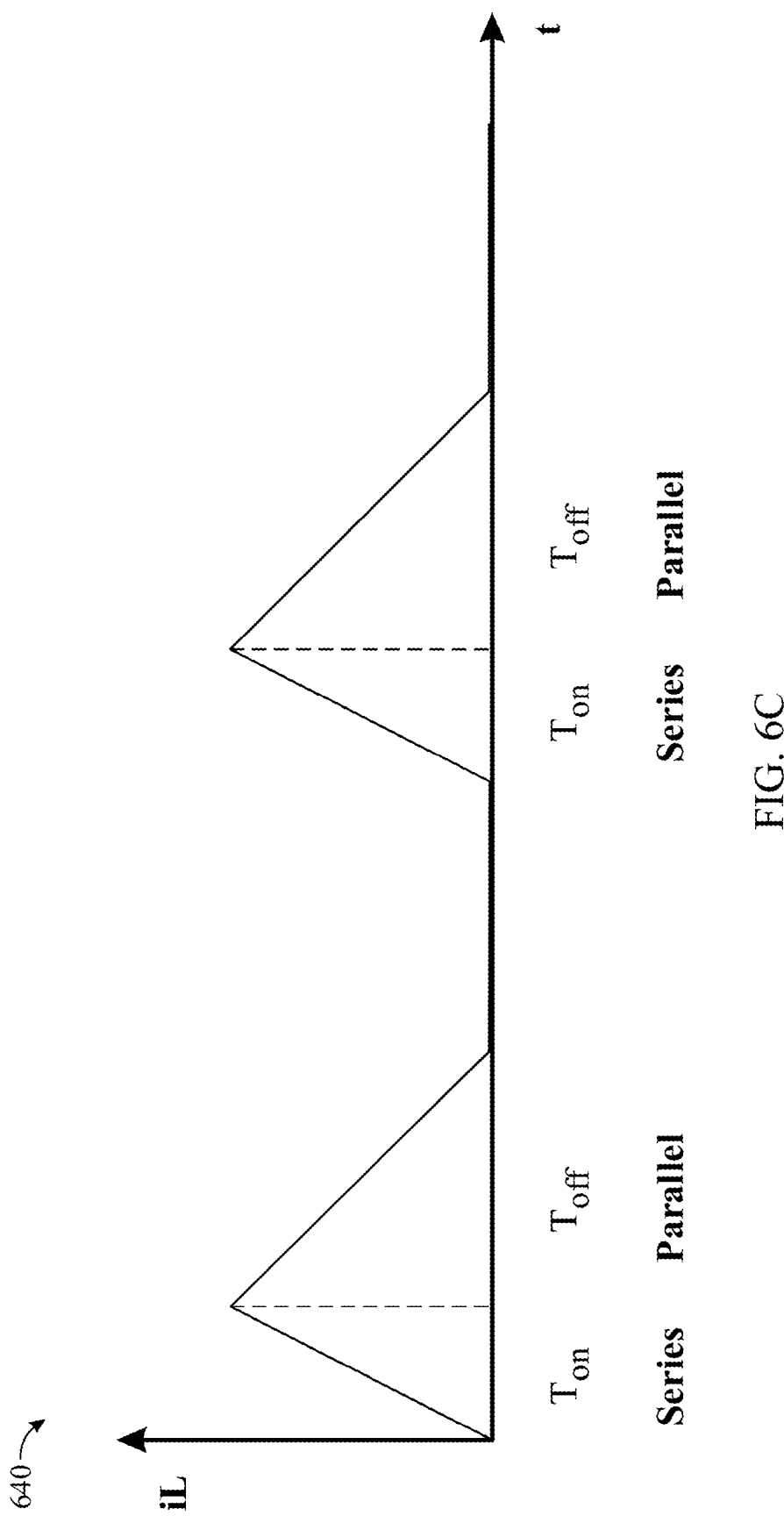
FIG. 6C is a plot of example inductor current (iL) over time (t) showing unequal times for the first and second phases of the two-level buck converter mode, in accordance with certain aspects of the present disclosure.

FIG. 6C is a plot 640 of example inductor current (iL) over time (t), in accordance with certain aspects of the present disclosure. Although the on-time interval (Ton) for the first phase of the two-level buck converter mode (when the flying capacitor Cfly is connected in series with the balancing capacitor Cbal) is shorter than the off-time interval (Toff) for the second phase (when Cfly is connected in parallel with Cbal), no inductor current passes through the flying capacitor Cfly in the two-level buck converter mode, unlike in the Cfly charging and discharging phases for the three-level buck converter mode. Therefore, the Ton and Toff duration imbalance does not affect the Cfly balance performance. With this scheme for the first and second phases of the two-level buck converter mode, the flying capacitor is fully balanced, and the inductor current peaks are more even when transitioning from the two-level to the three-level buck converter mode, and may take a relatively shorter time (e.g., 8 μs) to settle.

Figure 7:
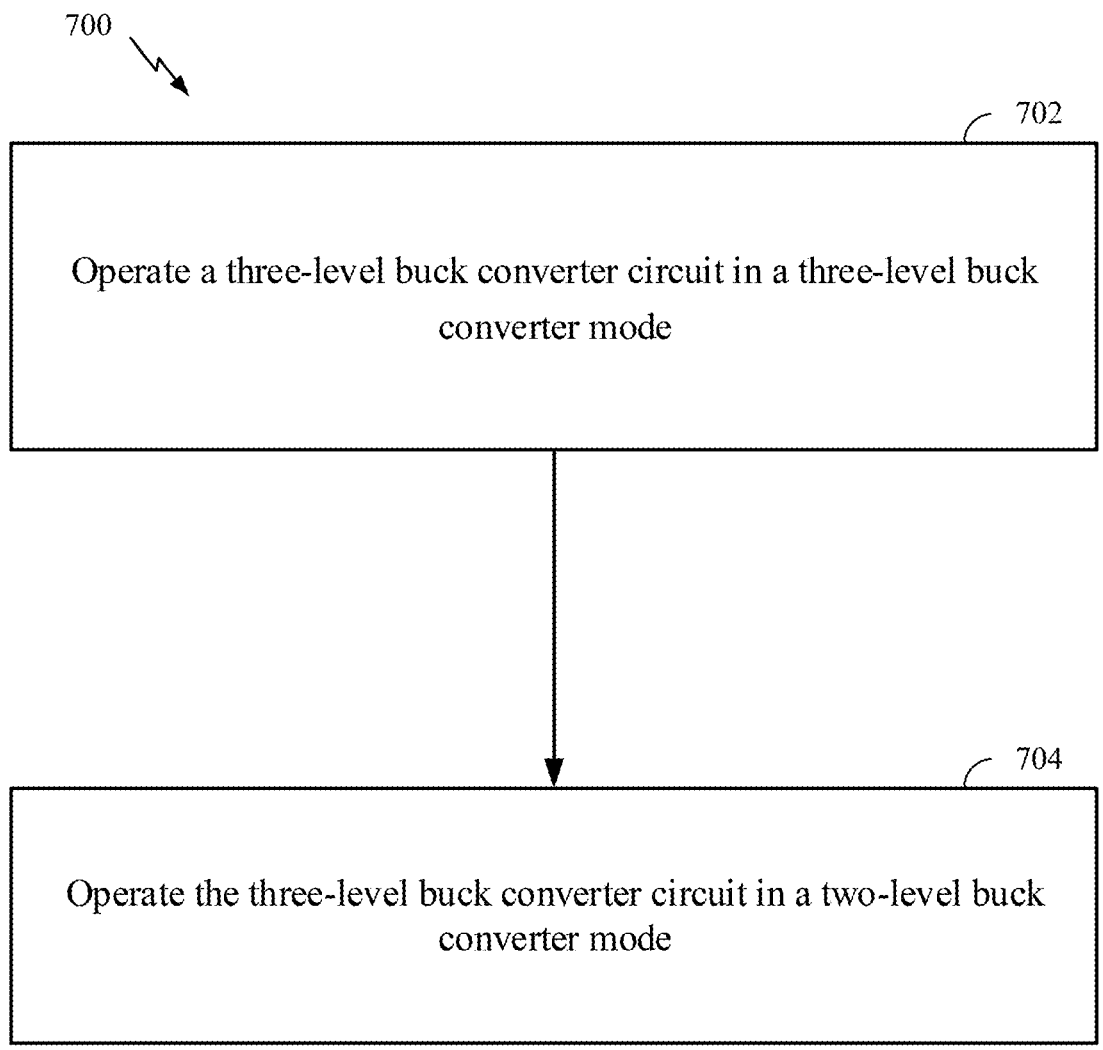
FIG. 7 is a flow diagram of example operations for regulating power, in accordance with certain aspects of the present disclosure.

Example Operations for Power Regulation with a Three-Level Buck Converter Circuit FIG. 7 is a flow diagram of example operations 700 for regulating power, in accordance with certain aspects of the present disclosure. The operations 700 may be performed by a power supply circuit, such as the power supply circuit 300 of FIG. 3, with a three-level buck converter circuit (e.g., as shown in FIG. 3 and/or FIGS. 6A and 6B). The operations 700 may be controlled by a controller or a control circuit, such as the control logic 220 of FIG. 2 or the control logic 301 of FIG. 3.

The operations 700 may begin, at block 702, by operating a three-level buck converter circuit in a three-level buck converter mode (e.g., with four phases as described above). At block 704, the three-level buck converter circuit may be operated in a two-level buck converter mode (e.g., with two phases as described above).

According to certain aspects, the operations 700 may further include detecting a light load condition for the three-level buck converter circuit while operating the three-level buck converter circuit in the three-level buck converter mode (e.g., at block 702). Then, the three-level buck converter circuit may be operated in the two-level buck converter mode (e.g., at block 704) based on the detection of the light load condition.

According to certain aspects, the operations 700 may further include sensing an output current (e.g., $I_{out}$) of the three-level buck converter circuit while operating the three-level buck converter circuit in the three-level buck converter mode (e.g., at block 702). The power supply circuit may determine the output current of the three-level buck converter circuit is lower than a first threshold (e.g., the light load entering threshold), and then the three-level buck converter circuit may be operated in the two-level buck converter mode (e.g., at block 704) based on the determination. In certain aspects, the operations 700 may further involve sensing the output current of the three-level buck converter circuit while operating the three-level buck converter circuit in the two-level buck converter mode (e.g., at block 704), determining the output current of the three-level buck converter circuit is higher than a second threshold (e.g., the light load exiting threshold), and returning to operating the three-level buck converter circuit in the three-level buck converter mode (e.g., at block 702) based on the determination. In this case, the second threshold may be higher than the first threshold.

According to certain aspects, the three-level buck converter circuit may comprise a first switch (e.g., transistor Q1); a second switch (e.g., transistor Q2) coupled to the first switch via a first node (e.g., the CFH node); a third switch (e.g., transistor Q3) coupled to the second switch via a second node (e.g., the VSW node); a fourth switch (e.g., transistor Q4) coupled to the third switch via a third node (e.g., the CFL node); a first capacitive element (e.g., flying capacitor Cfly) coupled between the first node and the third node; and an inductive element (e.g., inductive element L1) coupled between the second node and an output node. In certain aspects, operating the three-level buck converter circuit in the two-level buck converter mode (e.g., at block 704) may comprise, in a first phase of the two-level buck converter mode, closing the first switch and the second switch and opening the third switch and the fourth switch and, in a second phase of the two-level buck converter mode, opening the first switch and the second switch and closing the third switch and the fourth switch. For certain aspects, the first switch and the second switch in the three-level buck converter circuit may be closed with a constant on-time in the first phase. For other aspects, the first switch and the second switch in the three-level buck converter circuit may be closed according to a peak current in the first phase.

According to certain aspects, the operations 700 may further include sensing an output current of the three-level buck converter circuit while operating the three-level buck converter circuit in the two-level buck converter mode (e.g., at block 704); determining the output current of the three-level buck converter circuit is higher than a threshold (e.g., the light load exiting threshold); and returning to operating the three-level buck converter circuit in the three-level buck converter mode (e.g., at block 702) based on the determination.

According to certain aspects, the operations 700 may further involve sensing an output voltage of an amplifier (e.g., error amplifier 312) having a first input (e.g., the negative input) coupled to an output node (e.g., the VOUT node) of the three-level buck converter circuit, having a second input (e.g., the positive input) coupled to a voltage source (e.g., voltage source 313), and having an output coupled to the first input via a capacitive element (e.g., capacitor C1); determining the output voltage of the amplifier is higher than a threshold (e.g., the light load exiting threshold) while operating the three-level buck converter circuit in the two-level buck converter mode (e.g., at block 704); and returning to operating the three-level buck converter circuit in the three-level buck converter mode (e.g., at block 702) based on the determination.

According to certain aspects, the three-level buck converter circuit may comprise a first switch; a second switch coupled to the first switch via a first node; a third switch coupled to the second switch via a second node; a fourth switch coupled to the third switch via a third node; a first capacitive element coupled between the first node and the third node; and an inductive element coupled between the second node and an output node. In this case, a fifth switch (e.g., transistor Qcbal_h) may be coupled between the first node and a terminal of a second capacitive element (e.g., the balancing capacitor Cbal), and a sixth switch (e.g., transistor Qcbal_l) may be coupled between the third node and the terminal of the second capacitive element. In this case, operating the three-level buck converter circuit in the two-level buck converter mode (e.g., at block 704) may comprise, in a first phase of the two-level buck converter mode, closing the first switch, the second switch, and the sixth switch and opening the third switch, the fourth switch, and the fifth switch; and, in a second phase of the two-level buck converter mode, opening the first switch, the second switch, and the sixth switch and closing the third switch, the fourth switch, and the fifth switch. For certain aspects, a capacitance of the second capacitive element may be substantially equal to a capacitance of the first capacitive element. In this case, an on-time interval (e.g., Ton) of the first phase may differ from an off-time interval (e.g., Toff) of the second phase.

EXAMPLE ASPECTS

In addition to the various aspects described above, specific combinations of aspects are within the scope of the disclosure, some of which are detailed below:

Aspect 1: A power supply circuit comprising a three-level buck converter circuit and a control circuit coupled to the three-level buck converter circuit. The three-level buck converter circuit has a first switch, a second switch coupled to the first switch via a first node, a third switch coupled to the second switch via a second node, a fourth switch coupled to the third switch via a third node, a first capacitive element coupled between the first node and the third node, and an inductive element coupled between the second node and an output node. The control circuit is configured to control operation of the three-level buck converter circuit between a three-level buck converter mode and a two-level buck converter mode.

Aspect 2: The power supply circuit of Aspect 1, wherein the control circuit is configured to control operation of the three-level buck converter circuit to enter the two-level buck converter mode based on an output current of the three-level buck converter circuit being lower than a first threshold.

Aspect 3: The power supply circuit of Aspect 2, wherein the control circuit is configured to control operation of the three-level buck converter circuit to exit the two-level buck converter mode based on the output current of the three-level buck converter circuit being higher than a second threshold, wherein the second threshold is higher than the first threshold.

Aspect 4: The power supply circuit of Aspect 2 or 3, wherein the first threshold is 300 mA.

Aspect 5: The power supply circuit of any preceding Aspect, wherein in the two-level buck converter mode, the control circuit is configured to: control closure of the first switch and the second switch and control opening of the third switch and the fourth switch, in a first phase of the two-level buck converter mode; and control opening of the first switch and the second switch and control closure of the third switch and the fourth switch, in a second phase of the two-level buck converter mode.

Aspect 6: The power supply circuit of Aspect 5, wherein in the two-level buck converter mode, the control circuit is configured to control closure of the first switch and the second switch with a constant on-time in the first phase.

Aspect 7: The power supply circuit of Aspect 5, wherein in the two-level buck converter mode, the control circuit is configured to control closure of the first switch and the second switch according to a peak current in the first phase.

Aspect 8: The power supply circuit of any of Aspects 1 and 5-7, wherein the control circuit is configured to control operation of the three-level buck converter circuit to exit the two-level buck converter mode based on an output current of the three-level buck converter circuit being higher than a threshold.

Aspect 9: The power supply circuit of any of Aspects 1 and 5-7, further comprising an amplifier having a first input coupled to the output node, having a second input coupled to a voltage source, and having an output coupled to the control circuit and to the first input via a second capacitive element, wherein the control circuit is configured to control operation of the three-level buck converter circuit to exit the two-level buck converter mode based on an output voltage of the amplifier being above a threshold.

Aspect 10: The power supply circuit of Aspect 9, wherein the threshold is based on at least one of an on-time of the first switch and the second switch, an inductance of the inductive element, an input voltage of an input node coupled to the first switch, or an output voltage of the output node.

Aspect 11: The power supply circuit of any preceding Aspect, wherein: the first switch comprises a first transistor having a source coupled to the first node and having a drain coupled to an input node of the three-level buck converter circuit; the second switch comprises a second transistor having a drain coupled to the first node and having a source coupled to the second node; the third switch comprises a third transistor having a drain coupled to the second node and having a source coupled to the third node; and the fourth switch comprises a fourth transistor having a drain coupled to the third node and having a source coupled to a reference potential node of the power supply circuit.

Aspect 12: The power supply circuit of any preceding Aspect, further comprising a second capacitive element selectively coupled to the first node and selectively coupled to the third node.

Aspect 13: The power supply circuit of Aspect 12, further comprising: a fifth switch coupled between the first node and a terminal of the second capacitive element; and a sixth switch coupled between the third node and the terminal of the second capacitive element.

Aspect 14: The power supply circuit of Aspect 13, wherein in the two-level buck converter mode, the control circuit is configured to: control closure of the first switch, the second switch, and the sixth switch and control opening of the third switch, the fourth switch, and the fifth switch, in a first phase of the two-level buck converter mode; and control opening of the first switch, the second switch, and the sixth switch and control closure of the third switch, the fourth switch, and the fifth switch, in a second phase of the two-level buck converter mode.

Aspect 15: The power supply circuit of Aspect 14, wherein in the two-level buck converter mode: the second capacitive element is configured to be effectively connected in series with the first capacitive element in the first phase; and the second capacitive element is configured to be effectively connected in parallel with the first capacitive element in the second phase.

Aspect 16: The power supply circuit of Aspect 14 or 15, wherein an on-time interval of the first phase differs from an off-time interval of the second phase.

Aspect 17: The power supply circuit of any of Aspects 13-16, wherein in the three-level buck converter mode, the control circuit is configured to: control closure of the fifth switch based on closure of the second switch and the fourth switch; and control closure of the sixth switch based on closure of the first switch and the third switch.

Aspect 18: The power supply circuit of any of Aspects 13-17, wherein in the two-level buck converter mode, the control circuit is configured to: control closure of the fifth switch based on closure of the third switch and the fourth switch; and control closure of the sixth switch based on closure of the first switch and the second switch.

Aspect 19: The power supply circuit of any of Aspects 12-18, wherein a capacitance of the second capacitive element is substantially equal to a capacitance of the first capacitive element.

Aspect 20: A method of regulating power, comprising: operating a three-level buck converter circuit in a three-level buck converter mode and operating the three-level buck converter circuit in a two-level buck converter mode.

Aspect 21: The method of Aspect 20, further comprising detecting a light load condition for the three-level buck converter circuit while operating the three-level buck converter circuit in the three-level buck converter mode, wherein the three-level buck converter circuit is operated in the two-level buck converter mode based on the detection of the light load condition.

Aspect 22: The method of Aspect 20 or 21, further comprising: sensing an output current of the three-level buck converter circuit while operating the three-level buck converter circuit in the three-level buck converter mode; and determining the output current of the three-level buck converter circuit is lower than a first threshold, wherein the three-level buck converter circuit is operated in the two-level buck converter mode based on the determination.

Aspect 23: The method of Aspect 22, further comprising: sensing the output current of the three-level buck converter circuit while operating the three-level buck converter circuit in the two-level buck converter mode; determining the output current of the three-level buck converter circuit is higher than a second threshold, wherein the second threshold is higher than the first threshold; and returning to operating the three-level buck converter circuit in the three-level buck converter mode based on the determination.

Aspect 24: The method of any of Aspects 20-23, wherein: the three-level buck converter circuit comprises: a first switch, a second switch coupled to the first switch via a first node, a third switch coupled to the second switch via a second node, a fourth switch coupled to the third switch via a third node, a first capacitive element coupled between the first node and the third node, and an inductive element coupled between the second node and an output node; and operating the three-level buck converter circuit in the two-level buck converter mode comprises: in a first phase of the two-level buck converter mode, closing the first switch and the second switch and opening the third switch and the fourth switch, and in a second phase of the two-level buck converter mode, opening the first switch and the second switch and closing the third switch and the fourth switch.

Aspect 25: The method of Aspect 24, wherein the first switch and the second switch are closed with a constant on-time in the first phase.

Aspect 26: The method of Aspect 24, wherein the first switch and the second switch are closed according to a peak current in the first phase.

Aspect 27: The method of any of Aspects 20, 21, and 24-26, further comprising: sensing an output current of the three-level buck converter circuit while operating the three-level buck converter circuit in the two-level buck converter mode; determining the output current of the three-level buck converter circuit is higher than a threshold; and returning to operating the three-level buck converter circuit in the three-level buck converter mode based on the determination.

Aspect 28: The method of any of Aspects 20, 21, and 24-26, further comprising: sensing an output voltage of an amplifier having a first input coupled to an output node of the three-level buck converter circuit, having a second input coupled to a voltage source, and having an output coupled to the first input via a capacitive element; determining the output voltage of the amplifier is higher than a threshold while operating the three-level buck converter circuit in the two-level buck converter mode; and returning to operating the three-level buck converter circuit in the three-level buck converter mode based on the determination.

Aspect 29: The method of any of Aspects 20-23, wherein: the three-level buck converter circuit comprises: a first switch, a second switch coupled to the first switch via a first node, a third switch coupled to the second switch via a second node, a fourth switch coupled to the third switch via a third node, a first capacitive element coupled between the first node and the third node, and an inductive element coupled between the second node and an output node; a fifth switch is coupled between the first node and a terminal of a second capacitive element; a sixth switch is coupled between the third node and the terminal of the second capacitive element; and operating the three-level buck converter circuit in the two-level buck converter mode comprises: in a first phase of the two-level buck converter mode, closing the first switch, the second switch, and the sixth switch and opening the third switch, the fourth switch, and the fifth switch; and in a second phase of the two-level buck converter mode, opening the first switch, the second switch, and the sixth switch and closing the third switch, the fourth switch, and the fifth switch.

Aspect 30: The method of Aspect 29, wherein: a capacitance of the second capacitive element is substantially equal to a capacitance of the first capacitive element; and an on-time interval of the first phase differs from an off-time interval of the second phase.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A power supply circuit comprising: a three-level buck converter circuit having: a first switch; a second switch coupled to the first switch via a first node; a third switch coupled to the second switch via a second node; a fourth switch coupled to the third switch via a third node; a first capacitive element coupled between the first node and the third node; and an inductive element coupled between the second node and an output node; and a control circuit coupled to the three-level buck converter circuit and configured to control operation of the three-level buck converter circuit between a three-level buck converter mode and a two-level buck converter mode, wherein in the two-level buck converter mode, the control circuit is configured to: control closure of the first switch and the second switch and control opening of the third switch and the fourth switch, in a first phase of the two-level buck converter mode; and control opening of the first switch and the second switch and control closure of the third switch and the fourth switch, in a second phase of the two-level buck converter mode.

2. The power supply circuit of claim 1, wherein the control circuit is configured to control operation of the three-level buck converter circuit to enter the two-level buck converter mode based on an output current of the three-level buck converter circuit being lower than a first threshold.

3. The power supply circuit of claim 2, wherein the first threshold is 300 mA.

4. The power supply circuit of claim 2, wherein the control circuit is configured to control operation of the three-level buck converter circuit to exit the two-level buck converter mode based on the output current of the three-level buck converter circuit being higher than a second threshold, wherein the second threshold is higher than the first threshold.

5. The power supply circuit of claim 1, wherein in the two-level buck converter mode, the control circuit is configured to control closure of the first switch and the second switch with a constant on-time in the first phase.

6. The power supply circuit of claim 1, wherein in the two-level buck converter mode, the control circuit is configured to control closure of the first switch and the second switch according to a peak current in the first phase.

7. The power supply circuit of claim 1, wherein the control circuit is configured to control operation of the three-level buck converter circuit to exit the two-level buck converter mode based on an output current of the three-level buck converter circuit being higher than a threshold.

8. The power supply circuit of claim 1, further comprising an amplifier having a first input coupled to the output node, having a second input coupled to a voltage source, and having an output coupled to the control circuit and to the first input via a second capacitive element, wherein the control circuit is configured to control operation of the three-level buck converter circuit to exit the two-level buck converter mode based on an output voltage of the amplifier being above a threshold.

9. The power supply circuit of claim 8, wherein the threshold is based on at least one of an on-time of the first switch and the second switch, an inductance of the inductive element, an input voltage of an input node coupled to the first switch, or an output voltage of the output node.

10. The power supply circuit of claim 1, wherein:
the first switch comprises a first transistor having a source coupled to the first node and having a drain coupled to an input node of the three-level buck converter circuit;
the second switch comprises a second transistor having a drain coupled to the first node and having a source coupled to the second node;
the third switch comprises a third transistor having a drain coupled to the second node and having a source coupled to the third node; and the fourth switch comprises a fourth transistor having a drain coupled to the third node and having a source coupled to a reference potential node of the power supply circuit.

11. The power supply circuit of claim 1, further comprising a second capacitive element selectively coupled to the first node and selectively coupled to the third node.

12. The power supply circuit of claim 11, further comprising:
a fifth switch coupled between the first node and a terminal of the second capacitive element; and
a sixth switch coupled between the third node and the terminal of the second capacitive element.

13. The power supply circuit of claim 11, wherein a capacitance of the second capacitive element is substantially equal to a capacitance of the first capacitive element.

14. The power supply circuit of claim 12, wherein in the two-level buck converter mode, the control circuit is further configured to: control closure of the sixth switch and control opening of the fifth switch, in the first phase of the two-level buck converter mode; and control opening of the sixth switch and control closure of the fifth switch, in the second phase of the two-level buck converter mode.

15. The power supply circuit of claim 12, wherein in the three-level buck converter mode, the control circuit is configured to:
control closure of the fifth switch based on closure of the second switch and the fourth switch; and
control closure of the sixth switch based on closure of the first switch and the third switch.

16. The power supply circuit of claim 12, wherein in the two-level buck converter mode, the control circuit is configured to:
control closure of the fifth switch based on closure of the third switch and the fourth switch; and
control closure of the sixth switch based on closure of the first switch and the second switch.

17. The power supply circuit of claim 14, wherein in the two-level buck converter mode:
the second capacitive element is configured to be effectively connected in series with the first capacitive element in the first phase; and
the second capacitive element is configured to be effectively connected in parallel with the first capacitive element in the second phase.

18. The power supply circuit of claim 14, wherein an on-time interval of the first phase differs from an off-time interval of the second phase.

19. A method of regulating power, comprising: operating a three-level buck converter circuit in a three-level buck converter mode; and operating the three-level buck converter circuit in a two-level buck converter mode, wherein the three-level buck converter circuit comprises: a first switch; a second switch coupled to the first switch via a first node; a third switch coupled to the second switch via a second node; a fourth switch coupled to the third switch via a third node; a first capacitive element coupled between the first node and the third node; and an inductive element coupled between the second node and an output node; and operating the three-level buck converter circuit in the two-level buck converter mode comprises: in a first phase of the two-level buck converter mode, closing the first switch and the second switch and opening the third switch and the fourth switch; and in a second phase of the two-level buck converter mode, opening the first switch and the second switch and closing the third switch and the fourth switch.

20. The method of claim 19, further comprising detecting a light load condition for the three-level buck converter circuit while operating the three-level buck converter circuit in the three-level buck converter mode, wherein the three-level buck converter circuit is operated in the two-level buck converter mode based on the detection of the light load condition.

21. The method of claim 19, further comprising:
sensing an output current of the three-level buck converter circuit while operating the three-level buck converter circuit in the three-level buck converter mode; and
determining the output current of the three-level buck converter circuit is lower than a first threshold, wherein the three-level buck converter circuit is operated in the two-level buck converter mode based on the determination.

22. The method of claim 21, further comprising:
sensing the output current of the three-level buck converter circuit while operating the three-level buck converter circuit in the two-level buck converter mode;
determining the output current of the three-level buck converter circuit is higher than a second threshold, wherein the second threshold is higher than the first threshold; and
returning to operating the three-level buck converter circuit in the three-level buck converter mode based on the determination.

23. The method of claim 19, wherein the first switch and the second switch are closed with a constant on-time in the first phase.

24. The method of claim 19, wherein the first switch and the second switch are closed according to a peak current in the first phase.

25. The method of claim 19, further comprising:
sensing an output current of the three-level buck converter circuit while operating the three-level buck converter circuit in the two-level buck converter mode;
determining the output current of the three-level buck converter circuit is higher than a threshold; and
returning to operating the three-level buck converter circuit in the three-level buck converter mode based on the determination.

26. The method of claim 19, further comprising:
sensing an output voltage of an amplifier having a first input coupled to an output node of the three-level buck converter circuit, having a second input coupled to a voltage source, and having an output coupled to the first input via a capacitive element;
determining the output voltage of the amplifier is higher than a threshold while operating the three-level buck converter circuit in the two-level buck converter mode; and
returning to operating the three-level buck converter circuit in the three-level buck converter mode based on the determination.

27. The method of claim 19, wherein: the three-level buck converter circuit further comprises: a fifth switch coupled between the first node and a terminal of a second capacitive element; a sixth switch coupled between the third node and the terminal of the second capacitive element; and operating the three-level buck converter circuit in the two-level buck converter mode further comprises: in the first phase of the two-level buck converter mode, closing the sixth switch and opening the fifth switch; and in the second phase of the two-level buck converter mode, opening the sixth switch and closing the fifth switch.

28. The method of claim 27, wherein:
- a capacitance of the second capacitive element is substantially equal to a capacitance of the first capacitive element; and
- an on-time interval of the first phase differs from an off-time interval of the second phase.

\* \* \* \* \*